US007199335B2

(12) United States Patent
Takami et al.

(10) Patent No.: US 7,199,335 B2
(45) Date of Patent: Apr. 3, 2007

(54) HEAT FUSING APPARATUS, METHOD OF CONTROLLING SAME AND IMAGE FORMING APPARATUS

(75) Inventors: Hiroshi Takami, Odawara (JP); Tomoyuki Makihira, Ashigarashimo-Gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/116,280

(22) Filed: Apr. 28, 2005

(65) Prior Publication Data

US 2005/0258158 A1     Nov. 24, 2005

(30) Foreign Application Priority Data

May 7, 2004    (JP)    ............................. 2004-139097

(51) Int. Cl.
    *H05B 1/02*    (2006.01)
(52) U.S. Cl. ...................... 219/497; 219/216; 219/505; 219/492; 219/508; 399/67; 399/69
(58) Field of Classification Search ................ 219/216, 219/492, 496, 497, 499, 501, 506, 508, 505; 399/66, 328, 335, 67, 69; 374/101, 20, 21
    See application file for complete search history.

(56) References Cited

U.S. PATENT DOCUMENTS

| 5,148,226 | A |   | 9/1992  | Setoriyama et al. | ........ 355/290 |
| 5,210,579 | A |   | 5/1993  | Setoriyama et al. | ........ 355/285 |
| 5,525,775 | A |   | 6/1996  | Setoriyama et al. | ........ 219/216 |
| 5,754,917 | A | * | 5/1998  | Fromm et al.      | ................ 399/33 |
| 5,991,585 | A | * | 11/1999 | Hanyu et al.      | ................ 399/69 |
| 6,026,257 | A |   | 2/2000  | Takami et al.     | ................ 399/66 |
| 6,111,230 | A | * | 8/2000  | Cao et al.        | ................ 219/501 |
| 6,421,139 | B1 |  | 7/2002  | Takami et al.     | ............... 358/1.2 |
| 6,438,348 | B2 |  | 8/2002  | Kobaru et al.     | ............... 399/333 |
| 6,453,131 | B1 | * | 9/2002 | Sasai             | ............ 399/70 |
| 6,516,165 | B2 |  | 2/2003  | Makihira et al.   | ............. 399/69 |

(Continued)

FOREIGN PATENT DOCUMENTS

JP    3-34005    2/1991

(Continued)

*Primary Examiner*—Mark Paschall
(74) *Attorney, Agent, or Firm*—Fitzpatrick, Cella, Harper & Scinto

(57) ABSTRACT

Disclosed is a heat fusing apparatus for thermally fusing toner that has been transferred to a printing medium from a toner image formed on an image bearing member using an electrophotographic process. Temperature is detected at the surface of a heating element or in the vicinity thereof. If control is performed so as to interrupt supply of power to the heating element based upon result of comparing the detected temperature and a reference value, the amount of current that flows into the heating element is detected and the reference value is changed over in accordance with the result of detection. Further, a pressure roller, which is a rotation member placed opposite the heating element, presses the printing medium against the heating element and transports the printing medium. The state of rotation of the roller is detected and the reference value is changed over in accordance with the result of detection. The apparatus prevents, without malfunction at the time of normal operation, the occurrence of a situation in which the entire fusing apparatus and peripheral devices must be repaired or replaced owing to overheating, and minimizes apparatus damage to thereby minimize the cost of replacement parts and service cost.

20 Claims, 17 Drawing Sheets

U.S. PATENT DOCUMENTS

| | | |
|---|---|---|
| 6,587,662 B2 | 7/2003 | Kobaru et al. .............. 399/323 |
| 6,744,993 B2 | 6/2004 | Takami ....................... 399/22 |
| 6,754,458 B2 | 6/2004 | Makihira .................... 399/92 |
| 2002/0025178 A1* | 2/2002 | Suzuki ........................ 399/30 |
| 2004/0202491 A1 | 10/2004 | Sakai et al. .................. 399/69 |
| 2005/0214044 A1 | 9/2005 | Sakakibara et al. ......... 399/333 |
| 2005/0258158 A1 | 11/2005 | Takami et al. .............. 219/216 |
| 2005/0280682 A1 | 12/2005 | Kato et al. .................. 347/102 |
| 2006/0000819 A1 | 1/2006 | Makihira et al. ........... 219/216 |
| 2006/0024071 A1 | 2/2006 | Takami ........................ 399/33 |
| 2006/0045589 A1 | 3/2006 | Iwasaki et al. ............. 399/328 |

FOREIGN PATENT DOCUMENTS

| | | |
|---|---|---|
| JP | 3-62207 | 3/1991 |
| JP | 4-44075 | 2/1992 |
| JP | 4-44076 | 2/1992 |
| JP | 4-44077 | 2/1992 |
| JP | 4-44078 | 2/1992 |
| JP | 4-44079 | 2/1992 |
| JP | 4-44080 | 2/1992 |
| JP | 4-44081 | 2/1992 |
| JP | 4-44082 | 2/1992 |
| JP | 4-44083 | 2/1992 |
| JP | 4-204980 | 7/1992 |
| JP | 4-204981 | 7/1992 |
| JP | 4-204982 | 7/1992 |
| JP | 4-204983 | 7/1992 |
| JP | 4-204984 | 7/1992 |
| JP | 8-248813 | 9/1996 |
| JP | 8-262923 | 10/1996 |

* cited by examiner

FIG. 10

|  | DETECTED VALUE OF HEATER CURRENT | |
|---|---|---|
|  | LOW LEVEL | HIGH LEVEL |
| THERMISTER 1 | 220°C | 220°C |
| THERMISTER 2 | 260°C | 220°C |
| THERMISTER 3 | 260°C | 220°C |

FIG. 14

|  | DETECTED VALUE OF HEATER CURRENT | | DETECTED VALUE OF MOTOR ROTATION | |
| --- | --- | --- | --- | --- |
|  | LOW LEVEL | HIGH LEVEL | ROTATING | NOT ROTATING |
| THERMISTER 1 | 220°C | 220°C | 220°C | 220°C |
| THERMISTER 2 | — | — | 260°C | 220°C |
| THERMISTER 3 | 260°C | 220°C | — | — |

HEAT FUSING APPARATUS, METHOD OF CONTROLLING SAME AND IMAGE FORMING APPARATUS

FIELD OF THE INVENTION

This invention relates to an image forming apparatus such as a copier, printer or facsimile machine that employ an electrophotographic process, and to a multifunction apparatus that is a combination of these devices. More particularly, the invention relates to a heat fusing apparatus in an image forming apparatus and to a method of controlling the same.

BACKGROUND OF THE INVENTION

A known thermal-type fusing apparatus used in an image forming apparatus has an energized heating element serving as a heat source, a power supply for supplying current to the heating element, temperature detecting means for detecting temperature in the vicinity of the heating element, and control means for controlling the supply of current from the power supply based upon a signal from the temperature detecting means. A printing medium carrying an unfixed image formed thereon by an image forming section of the image forming apparatus is heated and fused onto the medium. This arrangement regulates the image fusing temperature to a prescribed temperature for fixing the image.

In such a heat fusing apparatus, the fusing function will not be implemented if even one of the above-mentioned components, namely the heating element, power source, temperature detecting means or control means, does not function normally. Furthermore, there is the danger that the apparatus will be destroyed by overheating when energization runaway occurs. Accordingly, a fusing apparatus of this kind is equipped with the following abnormal-overheat safety devices to thereby prevent overheating, emission of smoke and fire at the time of energization runaway, as described by way of example in the specification of Japanese Patent Application Laid-Open No. 08-248813:

(1) By inserting a safety device (thermo-protector) such as a temperature fuse or thermostat into the energizing circuit of the heating element, passage of current into the heating element is interrupted when overheating occurs owing to energization runaway.
(2) In a case where temperature detecting means such as a thermister is placed in the vicinity of the heating element and the heating element becomes abnormally overheated, passage of current into the heating element is interrupted by current cut-off means such as a relay inserted into the energizing circuit. By setting the temperature at which the abnormal-overheat safety device operates to a temperature higher than that reached at the time of normal operation, malfunction at the time of normal operation can be prevented and the device will operate only at the time of abnormal overheating.

Further, there are abnormality sensing devices in which the output of a thermister is compared with a reference voltage and the heater forcibly opened. Specifically, there is a device (Japanese Patent Application Laid-Open No. 03-034005) in which the reference voltage used for the comparison is changed over for a fixed period of time during which a heater on/off signal is in the off state, a device (Japanese Patent Application Laid-Open No. 03-062207) in which a reference temperature for comparison used in sensing the abnormality is changed in dependence upon a change in control temperature between temperature during standby and temperature at the time of fusing, and a device (Japanese Patent Application Laid-Open No. 08-262923) in which a reference temperature for comparison used in sensing the abnormality is lowered once the reference temperature has been exceeded.

With regard to handling after the above-described abnormal-overheat safety device has been actuated, a serviceman need only replace the failed component of the fusing apparatus or the unit (heating element, power supply, temperature detecting means, control means, etc.) and the spent safety device such as a thermostat that has been actuated.

In actuality, however, owing to an excessive rise in environmental temperature from onset of overheating trouble in the fusing apparatus to actuation of the safety device such as a thermostat, not only such members as a pressure roller and ceramic heaters inside the fusing apparatus but also devices peripheral thereto are subjected to damage such as deformation and degradation. In a worst-case scenario, the entire fusing apparatus and peripheral devices must be repaired or replaced. In order to reduce damage that occurs at the time of energization runaway, the operating temperature of the abnormal-overheat safety device should be set very low. If the operating temperature is set very low, however, the abnormal-overheat safety device will be actuated at the time of normal operation and the image forming apparatus will malfunction.

SUMMARY OF THE INVENTION

Accordingly, an object of the present invention is to provide a heat fusing apparatus, a method of controlling same and an image forming apparatus having this heat fusing apparatus for preventing, without malfunction at the time of normal operation, the occurrence of a situation in which the entire fusing apparatus and peripheral devices must be repaired or replaced owing to the above-mentioned overheating, and for minimizing apparatus damage to thereby minimize the cost of replacement parts and service cost.

According to the present invention, the foregoing object is attained by providing a heat fusing apparatus for thermally fusing toner that has been transferred to a printing medium from a toner image formed on an image bearing member using an electrophotographic process, comprising: temperature detecting means, which is placed on the surface of a heating element or in the vicinity thereof, for detecting the temperature of the heating element; current control means for controlling amount of generated heat by controlling current, which is supplied to the heating element from a power supply line, in accordance with the temperature detected by the temperature detecting means; temperature comparing means for comparing an output value of the temperature detecting means with a reference value; power-supply interrupting means for interrupting supply of power to the heating element based upon result of comparison by the temperature comparing means; operational status sensing means for sensing operational status of the heat fusing apparatus; and reference-value changeover means for changing over the reference value in accordance with result of sensing by the operational status sensing means; wherein the reference-value changeover means changes over the reference value corresponding to temperature detecting means placed at least in an area not passed by the printing medium when a printing medium of small size passes through the apparatus.

Further, the operational status sensing means includes means for sensing amount of current that flows into the heating element. Further, the heat fusing apparatus includes a pressure roller comprising a rotation member placed opposite the heating element, the pressure roller pressing the printing medium against the heating element and transporting the printing medium, and the operational status sensing means includes means for sensing state of rotation of the pressure roller. Further, a plurality of the temperature detecting means, a plurality of the temperature comparing means and a plurality of the reference-value changeover means are provided, and at least two of the plurality of reference-value changeover means change over their reference values in a case where the operational status sensing means has been actuated.

Further, the present provides an image forming apparatus having a heat-fusing unit with the above-described characterizing features, a method of and program for controlling the heat fusing apparatus, and a storage medium storing the program.

In accordance with the present invention, the sensed temperature of an abnormally overheated heating element is changed over in accordance with the operational status of an image forming apparatus. As a result, even if there is a rise in temperature at the ends of the fusing apparatus at the time of normal operation, it is possible to interrupt the passage of current to the heating element at a low temperature at the time of energization runaway without actuating a safety device erroneously. Apparatus damage can be minimized and it is possible to reduce cost of replacement parts and service costs.

More specifically, by changing over the detection temperature of abnormal overheating at least at an area not passed by the printing paper in the passage of paper of large and small size through the apparatus, or changing over the detection temperature of an abnormally overheated heating element in accordance with the level of current that flows into the heating element, or changing over the detection temperature of an abnormally overheated heating element in accordance with the state of rotation of a pressure roller, or changing over the detection temperature of an abnormally overheated heating element in accordance with the level of current that flows into the heating element and state of rotation of the pressure roller, it is possible to interrupt the passage of current into the heating element at a low temperature at the time of energization runaway without actuating a safety device. Apparatus damage can be minimized and it is possible to reduce cost of replacement parts and service costs.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a diagram illustrating an operating temperature setting table of a safety circuit according to the first embodiment;

FIG. 14 is a diagram illustrating an operating temperature setting table of a safety circuit according to the second embodiment;

DETAILED DESCRIPTION OF THE PREFERRED EMBODIMENTS

[First Embodiment]
An embodiment of the present invention will now be described based upon the drawings.

Figure 1:
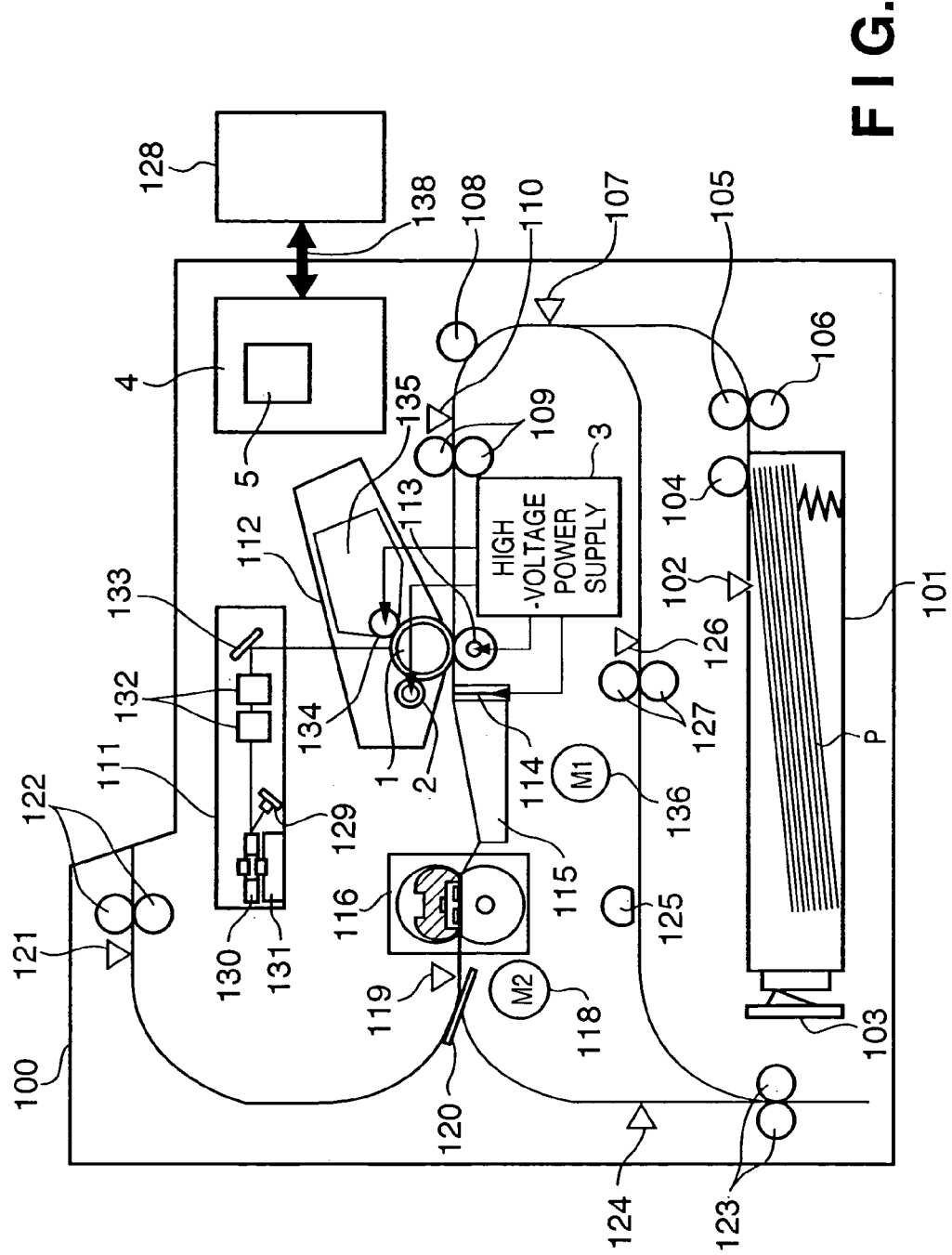
FIG. 1 is a diagram illustrating an example of the structure of an image forming apparatus according to a first embodiment of the present invention.

(1) Example of Structure of Image Forming Apparatus
FIG. 1 is a diagram illustrating the structure of a laser printer 100 according to this embodiment.

The laser printer 100 has a deck 101 that stores printing paper P and is provided with a deck paper sensor for sensing whether the deck 101 contains the printing paper P, a paper size sensor 103 for sensing the size of the printing paper P in the deck 101, a pick-up roller 104 for feeding the printing paper P from the deck 101, a deck paper feeding roller 105 for transporting the printing paper P fed by the pick-up roller 104, and a retard roller 106, which forms a pair with the deck paper feeding roller 105, for preventing overlapping feed of the printing paper P.

Disposed downstream of the deck paper feeding roller 105 are the deck 101, a paper feed sensor 107 for sensing the state of paper feed and transport from a double-side reversing section (described below), a paper feeding transport roller 108 for transporting the printing paper P farther downstream, a pair of registration rollers 109 for transporting the printing paper P in sync with print timing, and a pre-registration sensor 110 for sensing state of transport of the printing paper P to the registration rollers 109.

Disposed downstream of the registration rollers are a process cartridge 112 for forming a toner image on a photosensitive drum 1 based upon a laser beam from a laser scanner 111, a roller member (referred to as a transfer roller below) 113 for transferring the toner image, which has been formed on the photosensitive drum 1, to the printing paper P, and a discharging member (referred to as a de-electrification needle below) 114 for removing electric charge on the printing paper P and to facilitate separation of the paper from the photosensitive drum 1.

Disposed downstream of the de-electrification needle 114 are a transport guide 115, a fusing unit 116 for thermally fusing the toner image that has been transferred to the printing paper P, a fused-paper ejection sensor for sensing state of transport from the fusing unit 116, and a double-side flapper 120 for changing over the destination of the printing paper P, which has been transported from the fusing unit 116, to a paper ejecting section or to the double-side reversing section. Disposed downstream of the paper ejecting section are a paper ejection sensor 121 for sensing state of paper transport of the paper ejecting section, and a pair of paper ejecting rollers 122 for ejecting the printing paper.

In order to print on both sides of the printing paper P, the double-side reversing section is for turning over the printing paper P after one side thereof has been printed on and feeding the paper to the image forming section again. Disposed downstream of the double-side reversing section are a pair of reversing rollers 123 for switching back the printing paper P by rotating in forward and reverse directions, a reversal sensor 124 for sensing the state of paper feed to the reversing rollers 123, a D-cut roller 125 that transports the printing paper P from a horizontal registration section (not shown) for aligning the printing paper P in the horizontal direction, a double-side sensor 126 for sensing state of transport of the printing paper P in the double-side reversing section, and a pair of double-side transport rollers 127 for transporting the printing paper P from the double-side reversing section to the paper feed section.

(2) Example of Structure of Voltage Follower Output Circuit 16

Figure 2:
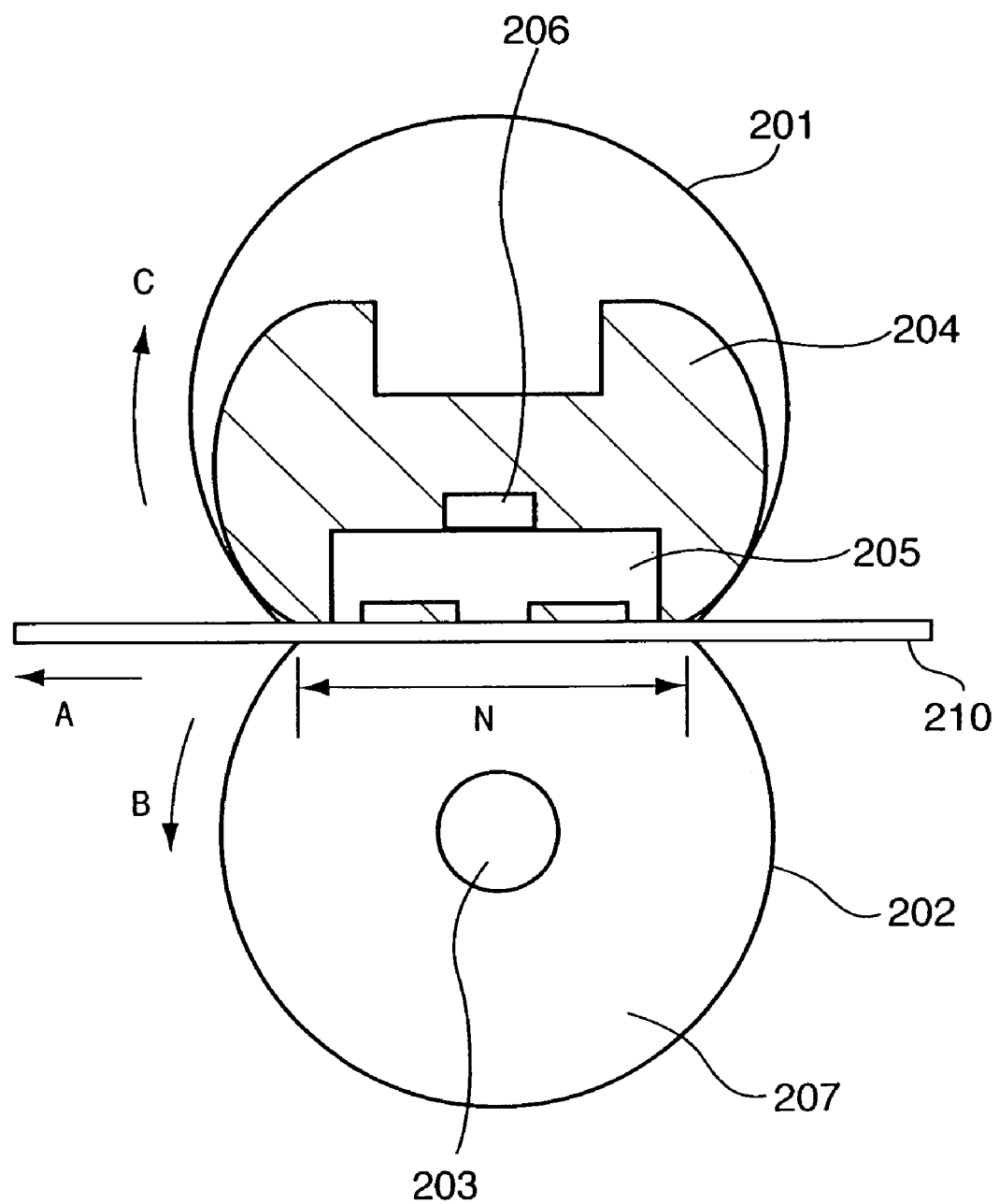
FIG. 2 is a diagram illustrating an example of the structure of a fusing apparatus according to the first embodiment.

FIG. 2 is a schematic view illustrating the structure of the fusing unit 116. The fusing unit of this example is a film-heating device disclosed in the specifications of Japanese Patent Application Laid-Open Nos. 4-44075 to 4-44083 and Japanese Patent Application Laid-Open Nos. 4-204980 to 4-204984, by way of example.

A heat-resistant, thermally insulating rigid-body stay 204 serves as both means for securing a ceramic heater and as a film inner-surface guide. The stay 204 is an elongated member the major axis of which extends in a direction (the direction orthogonal to the plane of the drawing) across the transport path of printing paper 210. A ceramic heater 205 (described later) is an elongated member the major axis of which extends in a direction across the transport path of the transfer member. The ceramic heater 205 is inserted into a groove, which has been formed in the bottom side of the stay 204 along the longitudinal direction thereof, and is fixed and supported in the groove by a heat-resistant adhesive. A cylindrical heat-resistant film (referred to as a "fusing film" below) 201 is fitted loosely over the stay 204 to which the ceramic heater 205 has been attached. For example, the fusing film 201, which has a thickness of 40 to 100 μm, is a single-layer film of PTFE, PFA or FEP, etc., having heat resistance, peeling resistance, strength and durability, or a multilayer film obtained by applying a coating of PTFE, PFA or FEP, etc., to the outer circumferential surface of a cylindrical film of polyimide, polyamide, PEEK, PES or PPS.

A pressure roller 202 is a flexible roller comprising a metal core 203 and a heat-resistant flexible layer 207 such as silicon rubber integrally provided concentrically on the outer periphery of the core in the form of a roller. The fusing film 201 is sandwiched between the pressure roller 202 and the ceramic heater 205 on the side of the stay 204 and is brought into pressured contact with the ceramic heater 205 against the resilience of the pressure roller 202. A zone indicated by arrow N is a fixing nip portion formed by the pressured contact. The pressure roller 202 is driven rotatively by a fusing drive motor M2 (118) at a prescribed peripheral speed in the direction of arrow B. As a result of rotative drive of the pressure roller 202, a rotating force acts directly upon the film 201 owing to a frictional force between the pressure roller 202 and the outer surface of the film 201 at the fixing nip portion N (when the printing paper 210 has been introduced into the fixing nip portion N in the direction of arrow A, the rotating force acts upon the film 201 indirectly via the printing paper 210), and the film 201 is driven rotatively in the clockwise direction of arrow C while it is brought into sliding pressured contact with the bottom side of the ceramic heater 205.

The stay 204 functions also as a guide member for the inner surface of the film 201 and facilitates the rotation of the film 201. In order to reduce the sliding resistance between the inner surface of the film 201 and the bottom surface of the ceramic heater 205, a small amount of lubricant such as heat-resistant grease can be interposed between them. When the rotation of the film 201 owing to rotation of the pressure roller 202 has become steady and the temperature of the ceramic heater 205 has risen to a prescribed level, the printing paper 210 on which an image is to be fixed is introduced between the film 201 and the pressure roller 202 at the fixing nip portion N, which is formed by the ceramic heater 205 and pressure roller 202 with the film 201 sandwiched between them, and the printing paper 210 is clamped and transported together with the film 201 at the fixing nip portion N, whereby the heat of the ceramic heater 205 is applied to the printing paper 210 and unfixed image via the film 201 so that the unfixed image on the printing paper 210 is thermally fused to the surface of the printing paper 210. Upon passing through the fixing nip portion N, the printing paper 210 is separated from the surface of the film 201 and transported. It should be noted that arrow A in FIG. 2 indicates the transport direction of the printing paper 210.

(3) Example of Structure of Ceramic Heater 205

Figure 3:
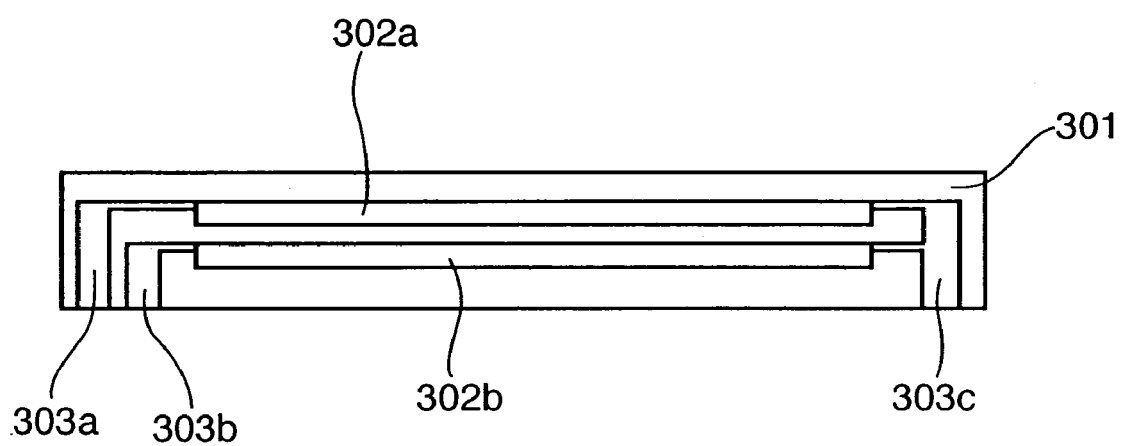
FIG. 3 is a diagram illustrating an example of the structure of a ceramic heater in the first embodiment.

FIG. 3 is a diagram illustrating an example of the structure of the ceramic heater 205. The latter is disposed lengthwise in a directly that is perpendicular to the transport direction of the printing paper.

Alumina ($Al_2O_3$) is used as a substrate 301 on one side of which two heating patterns 302a, 302b are formed by printing. The heating patterns 302a, 302b are covered by a glass protective film serving as an electrical insulating layer. In this embodiment, a heater portion formed by the heating pattern 302a is referred to as a main heater, and a heater portion formed by the heating pattern 302b is referred to as a sub-heater. Current feeding electrodes 303a, 303b, 303c are formed in such a manner that voltage can be impressed upon both ends of the heating patterns. The two electrodes 302a, 302b have exothermic distributions that differ greatly from each other.

Figure 4:
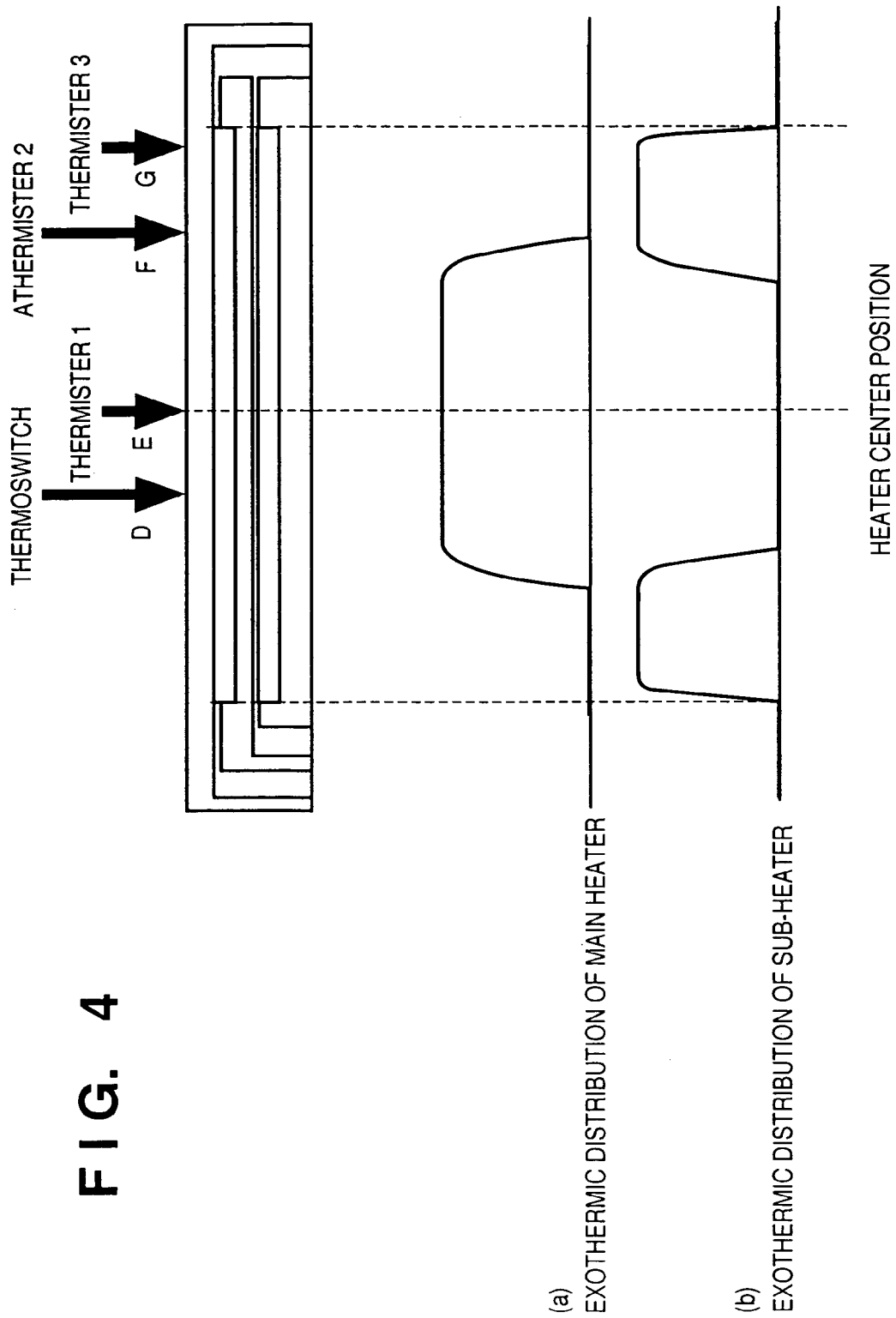
FIG. 4 is a diagram useful in describing an exothermic distribution in the first embodiment.

FIG. 4 illustrates the distributions of heat evolved by the main heater 302a and sub-heater 302b. The main heater 302a produces a large amount of heat at the central portion of the ceramic heater 205. The sub-heater 302b produces a large amount of heat at the end portions of the ceramic heater 205.

(4) Example of Thermister

In the fusing apparatus of this embodiment, three thermisters for measuring the temperature of the ceramic heater are provided. Each thermister is pressed against the ceramic heater 205 at a prescribed amount of pressure.

FIG. 4 illustrates the positional relationship of the thermisters, namely thermister 1, 2 and 3. Arrows E, F and G indicate the placement of the thermisters 1, 2 and 3 along the longitudinal direction of the ceramic heater. Thermister 1 is placed at the central part of the ceramic heater 205, and thermisters 2 and 3 are placed at the end portions of the ceramic heater 205. Each thermister is connected to a temperature detecting circuit, not shown.

Figure 6:
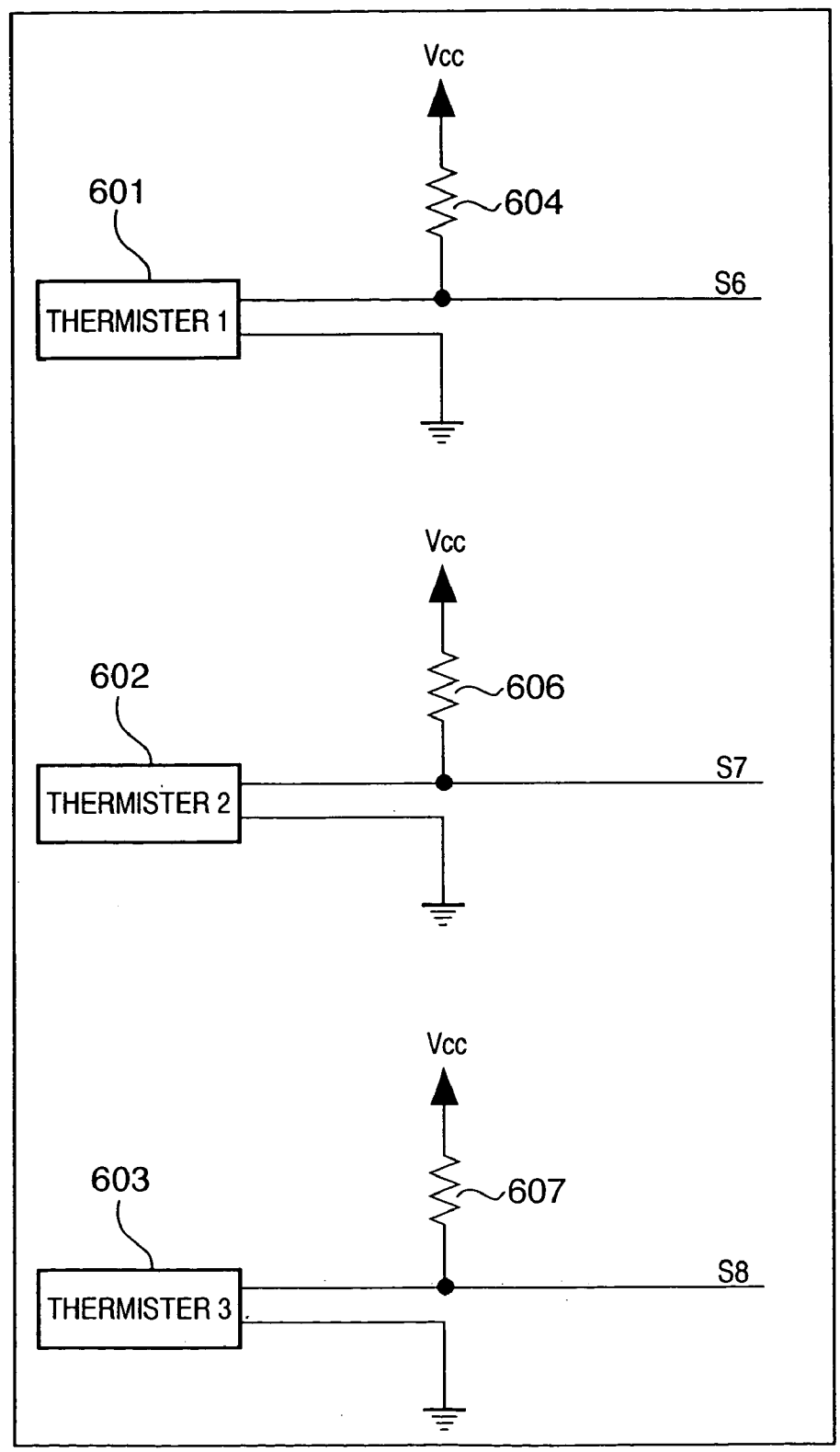
FIG. 6 is a diagram illustrating an example of the structure of a temperature detecting circuit according to the first embodiment.

FIG. 6 is an example of the internal circuitry of the temperature detecting circuit.

The thermister 1, 2 and 3 are serially connected to resistors 604, 605 and 606, respectively. Detection signals S6, S7 and S8 from the thermisters vary in accordance with the resistance values of the thermisters, which change with temperature. The detection signals S6, S7 and S8 are applied to a CPU 501 and to a safety circuit 509, described later. Although three thermisters 1, 2 and 3 are illustrated in this embodiment, the number of thermisters is not limited to three.

(5) Example of Thermo Switch

In the fusing apparatus of this embodiment, one thermostat (not shown) is provided as means for interrupting current when abnormal heating occurs. The thermo switch is pressed against the ceramic heater 205 at a prescribed amount of pressure.

The position of the thermo switch along the longitudinal direction of the ceramic heater is indicated by arrow D in FIG. 4. The operating temperature of the thermo switch is 250° C.

The operating temperature of the thermo switch will now be described. The operating temperature of the thermo switch has a strong relationship to the rate of temperature rise until the operating temperature is attained.

Figure 15:
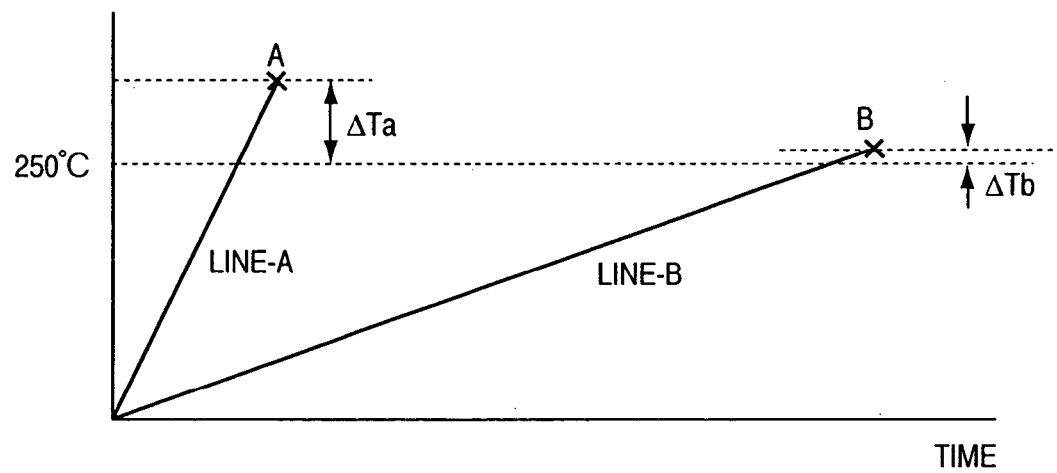
FIG. 15 is a diagram useful in describing the operating points of a thermostat.

FIG. 15 is a diagram illustrating the relationship between the temperature of the ceramic heater 205 and the temperature at which the thermo switch is actually actuated. LINE-B indicates a case where the heater has been heated at a low rate of temperature rise. Here the remote switch is actuated at point B, at which the ceramic heater 205 has been overheated beyond 250° C. by ΔTb. On the other hand, LINE-A indicates a case where the ceramic heater 205 has been heated at a high rate of temperature rise. In this case, the remote switch is not actuated at 250° C. but is actuated when the ceramic heater has been overheated beyond 250° C. by ΔTa. It should be noted that ΔTa is greater than ΔTb. In other words, the thermo switch has such a characteristic that the thermo switch is actuated at a temperature closer to the operating temperature (250° C.) the lower the rate of temperature rise until attainment of the operating temperature. Such a characteristic arises owing to the thermal capacity possessed by the thermo switch itself.

(6) Example of Power Control Circuit

Next, a power control circuit for supplying power to the ceramic heater 205 will be described. The power control circuit is adapted so as to control the main heater 302a and sub-heater 302b independently.

Figure 5:
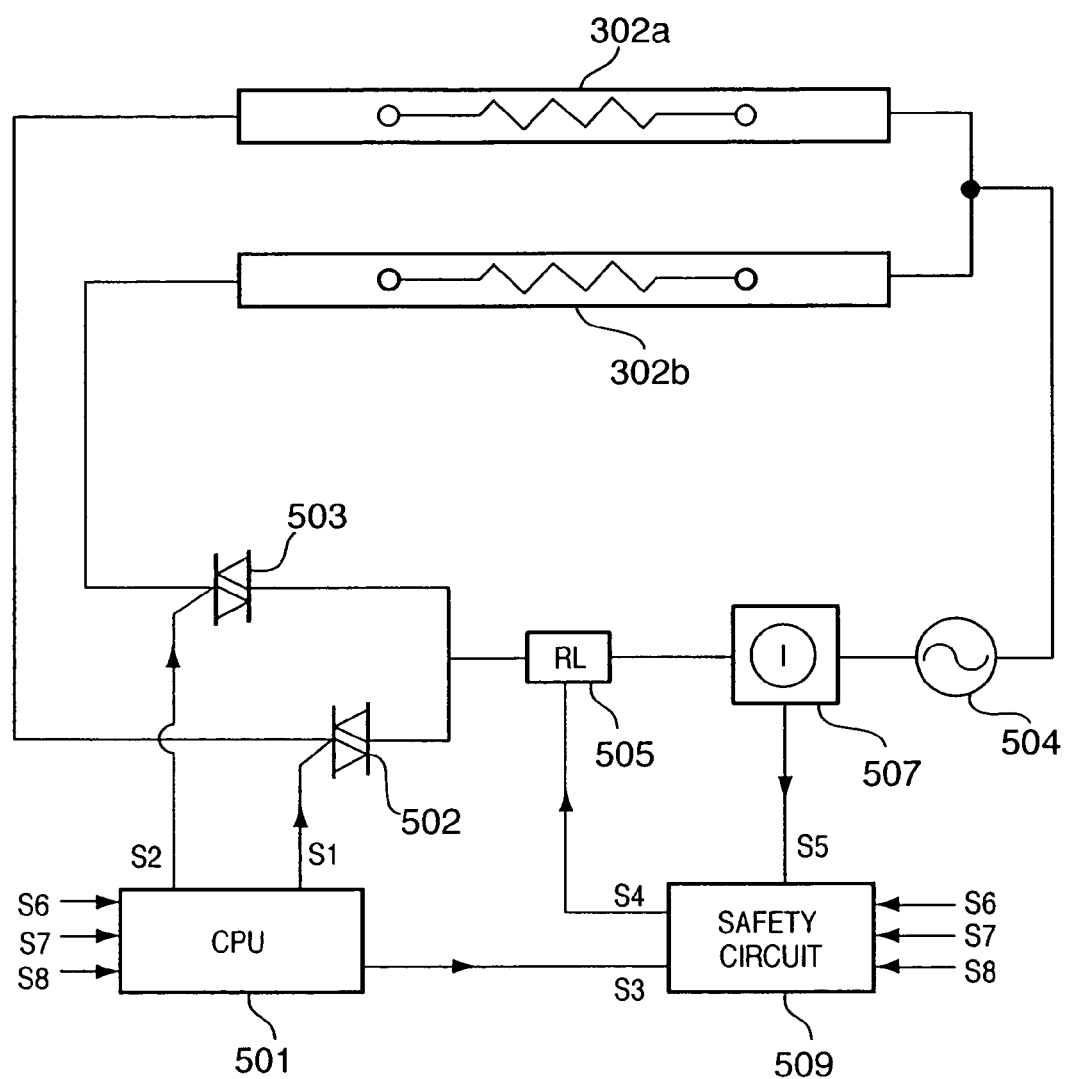
FIG. 5 is a diagram illustrating an example of the structure of a power control circuit according to the first embodiment.

FIG. 5 is a diagram illustrating an example of the connections of the power control circuit.

The power control circuit includes a CPU 501 for executing calculations and control, first and second triacs 502 and 503, respectively, an AC power source 504, a relay (RL) 505 and a current detecting circuit 507. The first triac 502 and main heater 302a are serially connected, the second triac 503 and sub-heater 302b are serially connected, and these series circuits are connected in parallel with the AC power source 504. The first and second triacs 502, 503 are turned ON and OFF by high/low levels of first and second heater drive signals S1, S2, respectively, from the CPU 501. The relay 505 is inserted between the AC power source 504 and the point at which the first and second triacs 502, 503 are connected to each other. The passage of current to the main heater 302a and sub-heater 302b can be interrupted by driving the relay 505. A signal S4 for controlling the relay 505 enters the relay from a safety circuit 509, described later. The current detecting circuit 507 is inserted between the relay 505 and the AC power source 504 and sends a current detection signal S5 to the safety circuit 509. The operation of the current detecting circuit 507 will be described later. The safety circuit 509 is controlled by a control signal S3 from the CPU 501.

According to this embodiment, each element of the power control circuit set forth below will be described with the focus on hardware circuitry. However, the CPU 501, the safety circuit 509 (509') and a motor rotation detecting circuit 1102 (described later), for example, can also be implemented by software or firmware. In such case a program exemplified in FIG. 17 with regard to a safety circuit 509' is stored in a ROM beforehand, or is loaded into a RAM from an external storage medium, and is executed by the CPU. In this specification, only the flowchart of FIG. 17 regarding the safety circuit 509' is illustrated. However, other processing also is possible under the control of a program and can readily be modified by one skilled in the art. Such implementations also are covered by the present invention.

Figure 11:
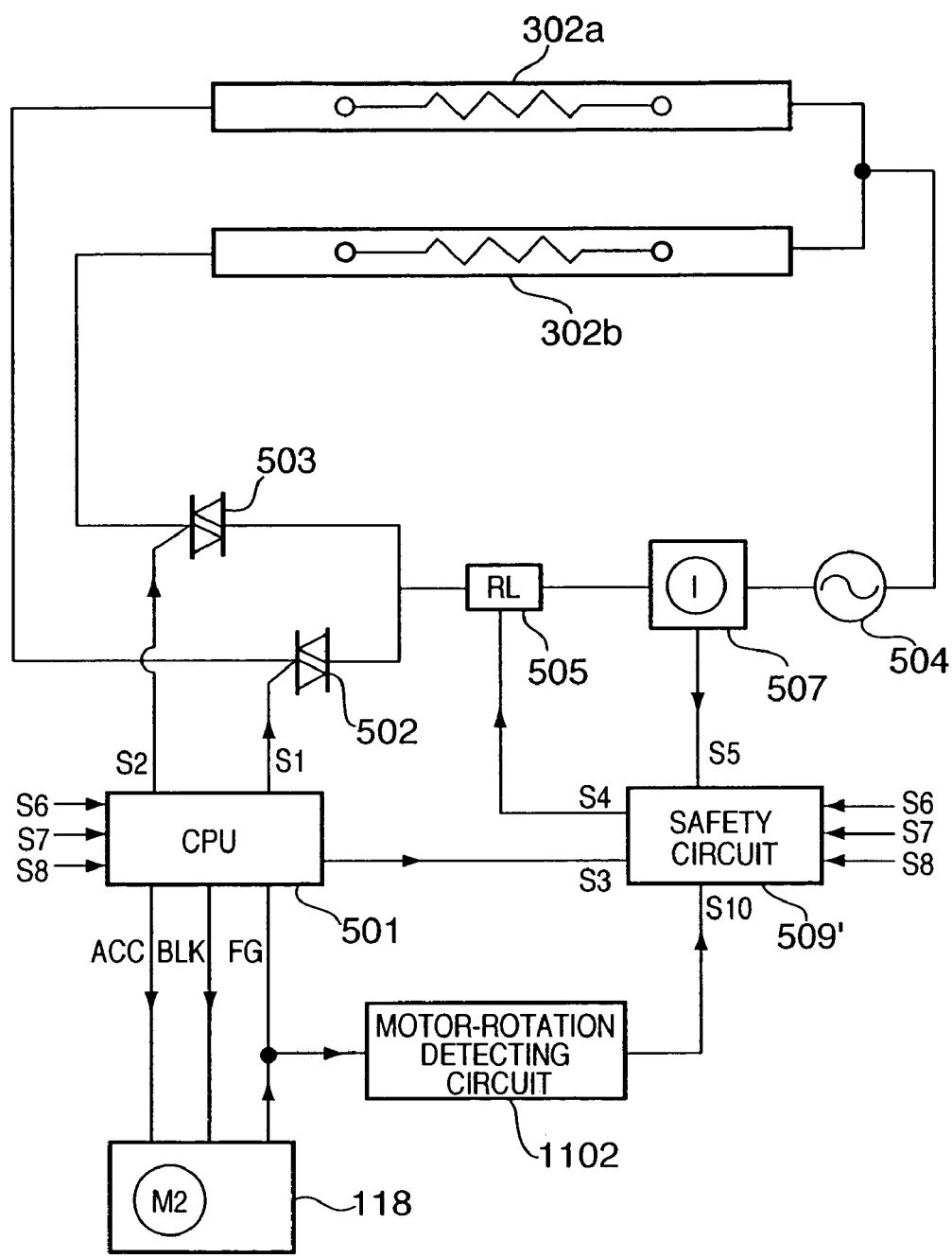
FIG. 11 is a diagram illustrating an example of the structure of a power control circuit according to a second embodiment of the present invention.

Further, the CPU 501 safety device 509 and motor rotation detecting circuit 1102, which are described as discrete elements in FIGS. 5 and 11, may be controlled commonly by an only CPU or commonly by a controller (not shown) of the image forming apparatus.

(7) Example of Power Control Sequence

A method of controlling power in this image forming apparatus will now be described. In this embodiment, passage of current into the main heater 302a and sub-heater 302b is turned on and off at a phase angle of within one half wave, thereby performing phase control for controlling the power applied to each heater.

(7-1) Control at Start-up Time

Upon receiving a print-start signal from a controller (not shown), the CPU 501 executes an image forming sequence. At the same time, the CPU 501 controls the first and second heater drive signals S1 and S2 to turn on the first and second triacs 502, 503, respectively, thereby raising the temperature of the ceramic heater 205. As the temperature of the ceramic heater 205 rises, the resistance value of thermister 1 falls. The CPU 501 monitors the output signal S6 from the thermister 1, thereby sensing and recognizing the temperature at the central portion of the ceramic heater 205. Power (Pup) applied to the ceramic heater 205 at this time is set based upon a difference between the temperature detected by the thermister 1 and a predetermined fusion target temperature. The temperature of the ceramic heater 205 can be raised in a short period of time by setting the power Pup to a high value. The power Pup can be set to a value of 80% or greater, where 100% is the power when the ON state is attained in all phases.

(7-2) Steady Temperature Control

If the temperature detected by thermister 1 has been detected to rise to a predetermined fusing temperature, then the power applied to the ceramic heater 205 is lowered to reduce the temperature of the ceramic heater 205. The applied power is thenceforth increased or decreased in accordance with the difference between the temperature detected by the thermister 1 and the predetermined fusion target temperature, thereby performing control in such a manner that the temperature at the central portion of the ceramic heater 205 becomes the fusion target temperature. The applied power (Psat) at this time is lower than the applied power (Pup) at start-up and is controlled to between 0% and 60%.

In the processing described above, the method of energizing the sub-heater 302b is changed in dependence upon the length of the printing paper along the direction orthogonal to the direction of paper transport, i.e., in accordance with the size of the paper width.

Figure 7:
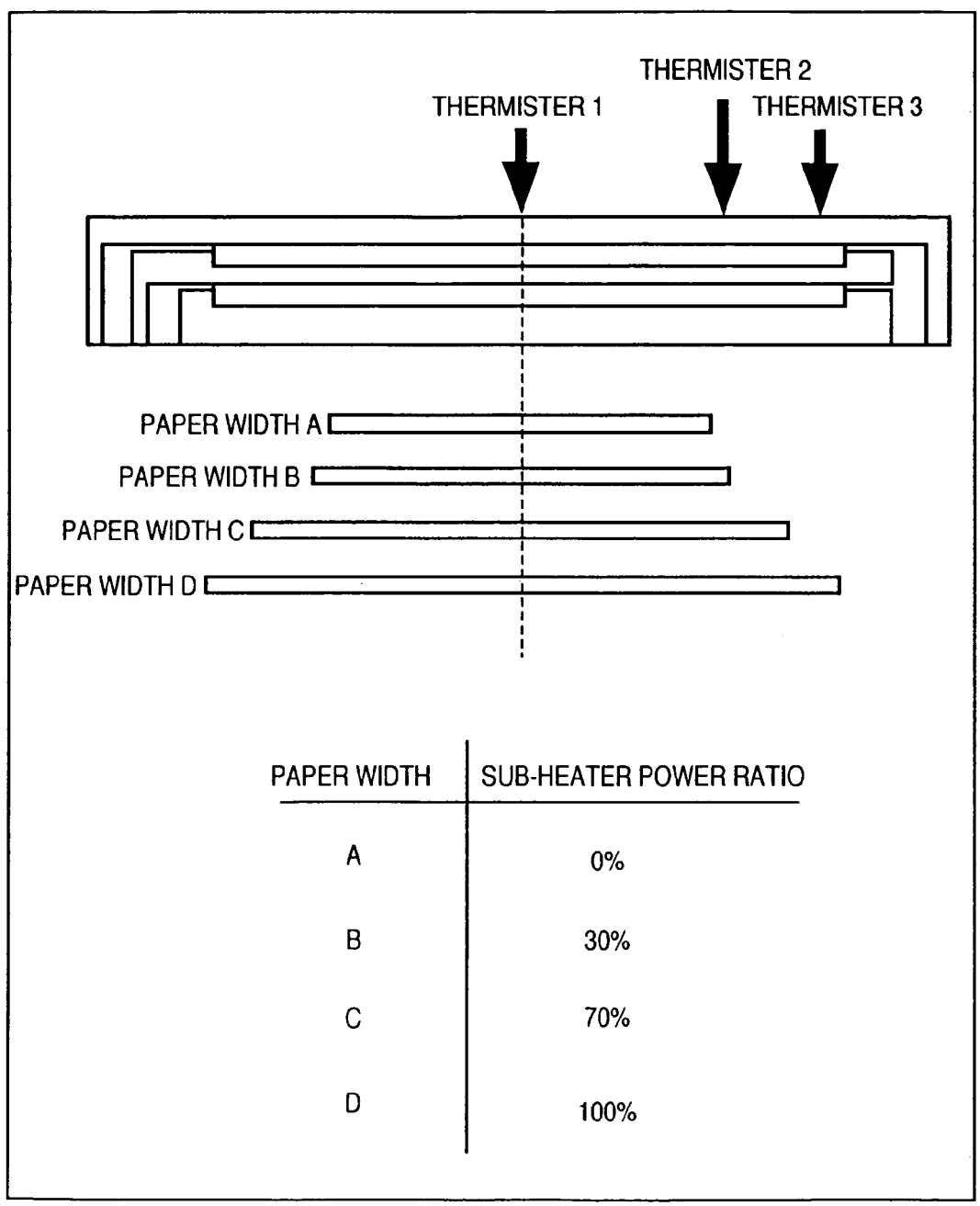
FIG. 7 is a diagram useful in describing power ratio in the first embodiment.

FIG. 7 is a diagram illustrating the relationship between the width of printing paper and the energization setting of the sub-heater 302b. Here the control method is changed over in four categories depending upon paper width. Sub-heater power ratio indicates the ratio of power impressed upon the sub-heater 302b to power impressed upon the main heater 302a. The second heater drive signal S2 implements control in accordance with this setting. The smaller the paper width, the lower the power ratio of the sub-heater 302b is set. This suppresses a phenomenon where the temperature at the ends of the fusing unit rises during printing (this phenomenon shall be referred to as "end temperature rise"). End temperature rise has a strong relationship to the size of printing paper width. In a case where the width of the printing paper is small in comparison with the width of the heating area of the fusing unit, the ends of the fusing unit are areas not traversed by the printing paper. Since the amount of heat carried off at the portion traversed by the printing paper and the amount of heat carried off at the portion not traversed by the printing paper differ greatly, the temperature at the ends of the ceramic motor rises. There is a possibility that this rise in temperature at the ends will give rise to various problems such as wrinkling and offset. If the paper that passes the fusing unit has a small width, the temperature non-uniformity of the ceramic heater 205 tends to increase.

(8) Example of Control for Dealing with End Temperature Rise

In this image forming apparatus, the temperature of the ceramic heater 205 at the ends is detected by the thermisters 2 and 3. If the temperature at the ends of the ceramic heater exceeds a predetermined temperature owing to end temperature rise, control is performed so as to lengthen the paper passing interval of the printing paper. By lengthening the paper passing interval of the printing paper, the temperature difference between the portion traversed by the printing paper and the portion not traversed by the printing paper diminishes and the end temperature rise can be suppressed.

Figure 8:
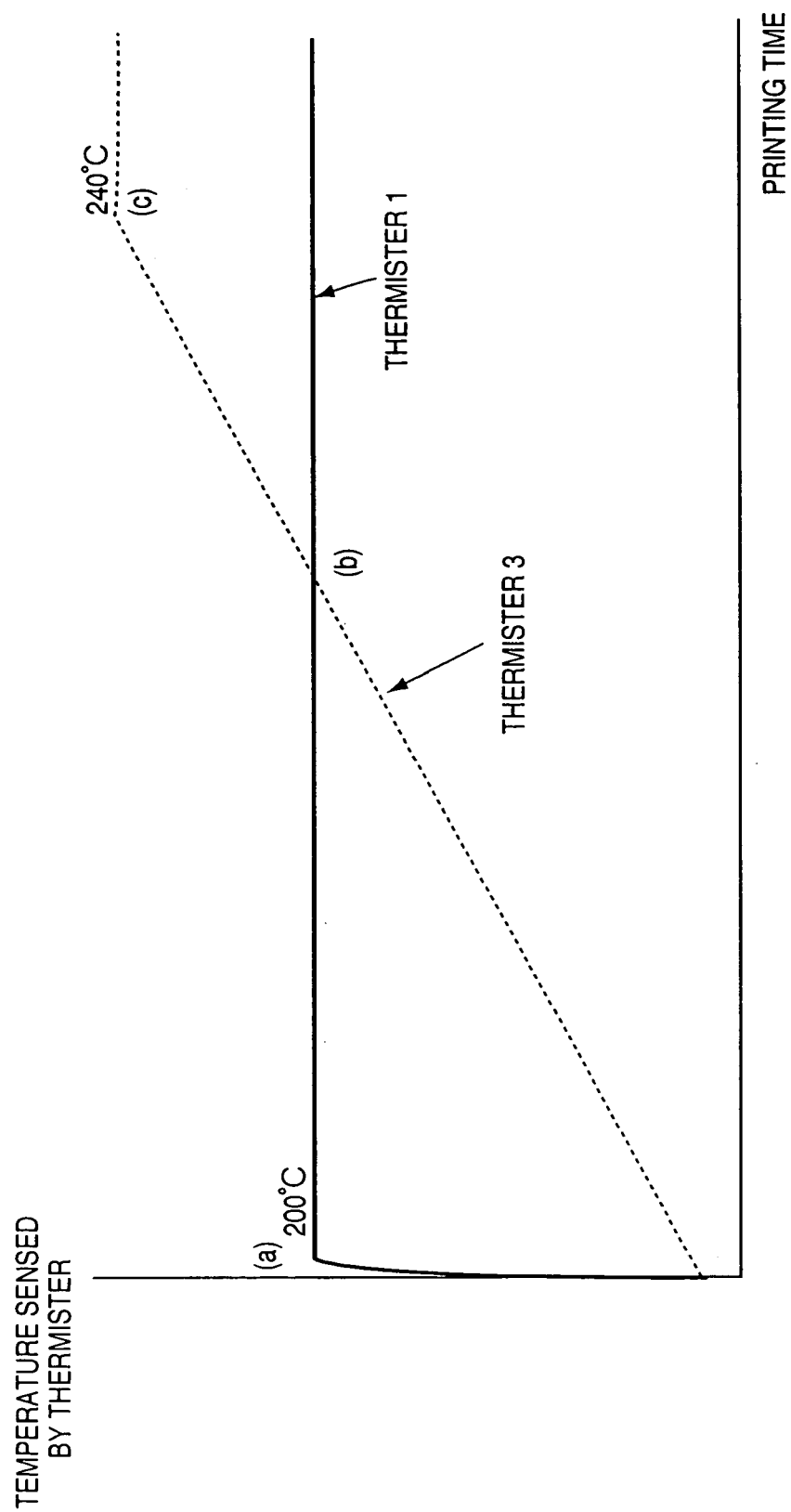
FIG. 8 is a diagram useful in describing a phenomenon referred to as "end temperature rise" in the first embodiment.

FIG. 8 is a diagram illustrating end temperature rise at passage of printing paper whose width is classified as "A" in FIG. 7. The horizontal axis is a plot of time from start of printing, and the vertical axis is a plot of temperatures detected by thermister 1 and thermister 3 placed at the central portion and at an end, respectively, of the ceramic heater 205. After the start of printing, power is supplied to the ceramic heater 205 in such a manner that the temperature detected by the thermister 1 attains a predetermined value. The temperature detected by the thermister 1 rises to 200° C. [(point (a)].

The temperature detected by thermister 1 is controlled so as to be constant from point (a) onward. The temperature detected by thermister 3, on the other hand, rises slowly after the start of printing. This is because the sub-heater 302b is not energized at passage of printing paper whose width is classified as "A". The temperature detected by thermister 3 rises beyond the temperature of 200° C. detected by thermister [point (b)] and reaches 240° C. [(point (c)]. When the temperature detected by thermister 3 reaches 240° C., control for lengthening the paper passing interval is carried out. As a result, the rise in temperature at the ends is halted.

(9) Example of Current Detecting Circuit 507

The current detecting circuit 507 is inserted between the relay 505 and AC power source 504. The current detecting circuit 507 detects the total current value of the current that flows into the main heater 302a and sub-heater 302b and outputs the detection signal S5. The current detection signal S5 is input to the safety circuit 509, described later. The detection signal S5 takes on the low level if the heater current value is greater than a reference current (Ipr). The reference current (Ipr) corresponds to heater current that flows when the applied power is at 80%. As mentioned above, the applied power exceeds 80% only in case of control at start-up. The detection signal S5, therefore, is at the low level only at the time of start-up.

(10) Example of Safety Circuit 509

The image forming apparatus of this embodiment is provided with the safety circuit 509 to avoid overheating of the ceramic heater 205 at the time of energization runaway. In addition to the above-mentioned thermo switch, a circuit for sensing abnormal overheating of the ceramic heater 205 using thermisters and interrupting the passage of current is provided.

Figure 9:
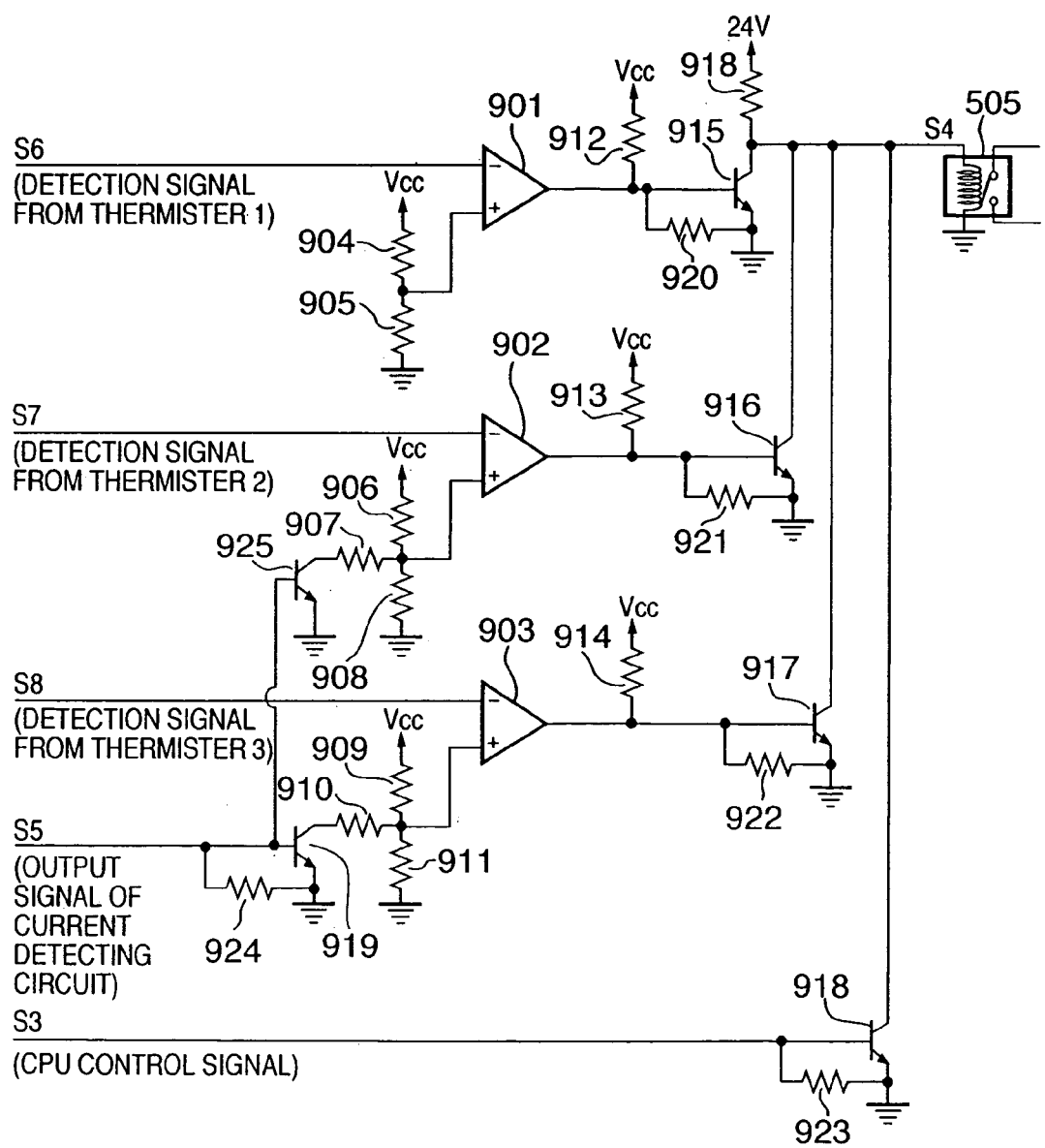
FIG. 9 is a diagram useful in describing a safety circuit according to the first embodiment.

FIG. 9 is a circuit diagram illustrating the safety circuit 509 for controlling interruption of current by detection using thermisters.

The detection signals S6, S7, S8 from the thermister 1, 2, 3, respectively, enter the negative input terminals of comparators 901, 902, 903, respectively, which compare these inputs with reference voltages (Vref) applied to the positive input terminals to thereby determine whether abnormal overheating has occurred. The reference voltage (Vref1) that is compared with the detection signal S6 of thermister 1 is a voltage value that is the result of voltage-dividing Vcc by resistors 904 and 905. If the comparator 901 is turned on by the result of the voltage comparison, a transistor 915 is turned on owing to a base current that flows in via a resistor 912. As a result, the relay control signal S4 assumes the low level; thereby halting the passage of current into the relay 505 and opening the relay.

The reference voltage (Vref2) that is compared with the detection signal S7 of thermister 2 is a voltage value that is decided by resistors 906, 907 and 908. The resistor 907 is connected is series with a transistor 925. The latter is driven by the output of the current detecting circuit 507. The reference voltage Vref2 is changed over in accordance with the result of detection by the current detecting circuit 507. The current detection signal S5 attains the high level if the heater current is greater than a predetermined value. Accordingly, if the heater current value is greater than the predetermined value, the reference voltage Vref2 takes on a voltage value that is the result of voltage-dividing Vcc by the resistor 906 and the combined resistance value of the parallel connection between the resistors 907 and 908. On the other hand, if the heater current value is less than the predetermined value, the current detection signal S5 reverts to the low level and the reference voltage Vref2 is decided by voltage division by the resistors 906 and 908.

The reference voltage (Vref3) that is compared with the detection signal S8 of thermister 3 is a voltage value that is decided by resistors 909, 910 and 911. Operation is similar to that of thermister 2. That is, if the heater current value is greater than a predetermined value, the reference voltage Vref3 takes on a voltage value that is the result of voltage-dividing Vcc by the resistor 909 and the combined resistance value of the parallel connection between the resistors 910 and 911. On the other hand, if the heater current value is less than the predetermined value, then the reference voltage Vref3 is decided by voltage division by the resistors 909 and 911.

FIG. 10 is a table of settings of safety-circuit operating temperatures corresponding to each of the thermisters. The operating temperature of the safety circuit 509 differs for each thermister.

The operating temperature of thermister 1 is 220° C. irrespective of the heater current. As mentioned above, the image forming apparatus of this embodiment is such that the ceramic heater 205 is controlled in such a manner that the value detected by thermister 1 becomes 200° C. Accordingly, the safety circuit 509 is not actuated at the time of normal operation. When energization runaway occurs, the detected temperature is 220° C., the safety circuit 509 operates and passage of current into the ceramic heater 205 can be interrupted.

The operating temperatures of thermisters 2 and 3 are changed over depending upon the heater current. The operating temperature in a case where the heater current is low is set to 260° C. At the time of normal operation, the values detected by thermisters 2 and 3 do not reach 260° C. even if end temperature rise occurs. The safety circuit 509, therefore, is not actuated. At the time of energization runaway, the thermo switch is actuated at the same time that the ceramic heater 205 reaches 250° C., and passage of current into the ceramic heater 205 is interrupted.

Figure 16:
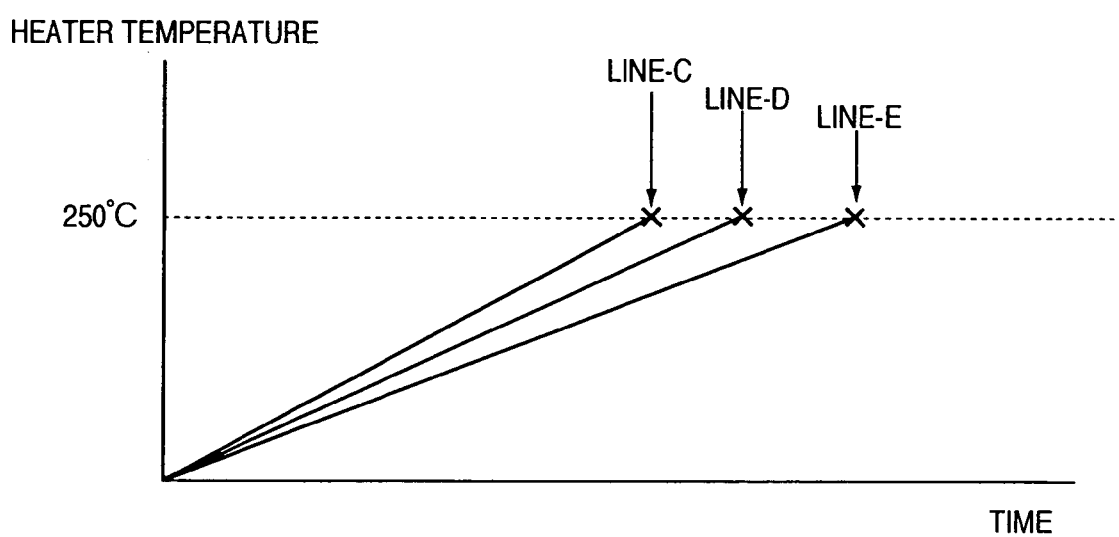
FIG. 16 is a diagram useful in describing the operation of a thermo switch according to an embodiment of the invention.

FIG. 16 is a diagram showing the relationship between the temperature of the ceramic heater 205 of a thermo switch at the time of energization runaway and the points at which the thermo switch is actuated. LINE-C indicates a case where only the main heater 302a has experienced energization runaway, LINE-D indicates a case where the main heater 302a and the sub-heater 302b have experienced energization runaway, and LINE-E indicates a case where only the sub-heater 302b has experienced energization runaway. The difference among the three lines arise owing to the exothermic distribution of each heater.

As illustrated in FIG. 4, the thermister 1 is placed in the area of the exothermic distribution of the main heater 302a. At the time of energization runaway of main heater 302a, the temperature in this area rises faster in comparison with energization runaway of the sub-heater 302b. In the case of energization runaway of either of the heaters, the thermo switch can be actuated at the same time that the temperature of the ceramic heater 205 attains the operating temperature (250° C.) of the thermo switch. The reason for this is that if the heater current is low, the power applied to the ceramic heater 205 also is low and the rate of temperature rise of the ceramic heater 205 is low.

If the heater current is high, on the other hand, the operating temperature is set to 220° C. The heater current attains the high level only at the time of heater start-up. Since end temperature rise is a phenomenon that occurs in a case where sheets of printing paper are passed one after another, as illustrated in FIG. 8, end temperature will not exceed 220° C. at the time of heater start-up. Accordingly, the safety circuit 509 will not be actuated at the time of normal operation. At the time of energization runaway, the safety circuit 509 is actuated at a detected temperature of 220° C. and current to the ceramic heater 205 is interrupted.

With the image forming apparatus of this embodiment, as described above, temperature detected by a plurality of abnormal-overheat sensing circuits using thermisters is changed over in accordance with the level of current that flows into the ceramic heater 205. As a result, even if end temperature rise occurs at the time of normal operation, the safety device will not be actuated erroneously. At the time of energization runaway, passage of current to the ceramic heater 205 can be interrupted at a low temperature.

In this embodiment, the total value of current that flows into the ceramic heater 205 is detected by the current detecting circuit 507 and a reference value that is compared with temperatures detected by thermisters 2 and 3 is changed over depending upon the level of the current. However, effects equivalent to those of the above embodiment can be attained even if the reference value compared with the temperatures detected by thermisters 2 and 3 is changed over depending upon the paper width of the paper passed, as illustrated in FIG. 7. That is, if the paper size is small (the paper width is small), the current that flows into the ceramic heater 205 becomes relatively small. If the paper size is large (the paper width is large), the current that flows into the ceramic heater 205 becomes relatively large. This is obvious from FIG. 7. However, rather than adopting an arrangement in which the reference value is changed over depending upon the paper size, a threshold value of the current value detected by the current detecting circuit 507 can be made to correspond to a difference in paper size, by way of example. If this arrangement is adopted, then this embodiment can be said to change over the reference value depending upon paper size.

In this case, it is preferred that the reference value corresponding to temperature detecting means placed at least in an area not traversed by the printing paper be changed over in the passing of printing paper of small size.

[Second Embodiment]

A second embodiment of the present invention will now be described. In the first embodiment, the level of the criterion of abnormal overheating of a plurality of thermisters is changed over in accordance with the result of detecting the current of a ceramic heater. The basic structure of the second embodiment is the same as that of the first embodiment but is characterized in that criterion for judging abnormal overheating is changed over in accordance with the state of rotation of a pressure roller. Only the elements of the second embodiment that differ from those of the first embodiment will be described.

(1) Example of Sensing of Rotation of Fusing Drive Motor

FIG. 11 is a diagram showing the circuit structure according to this embodiment.

Reference numeral 118 denotes the fusing drive motor M2 for rotating the pressure roller 202. The fusing drive motor M2 (118) is controlled to rotate at a constant speed by an ACC signal, BLK signal and FG (Frequency Generator) signal. The ACC signal is an acceleration signal, which is output from the CPU 501. When the ACC signal is placed in the ON state, the fusing drive motor M2 (118) is accelerated. The BLK signal, on the other hand, is a deceleration signal that is output from the CPU 501. When the BLK signal is placed in the ON state, the fusing drive motor M2 (118) is decelerated. The FG signal is a rotating-speed detection signal. The FG signal that is output is composed of pulses of a frequency that is proportional to the rotating speed of the motor. The CPU 501 controls the rotating speed to a predetermined level by controlling the ACC signal and BLK signal in such a manner that the frequency of the FG signal becomes a predetermined value.

Figure 12:
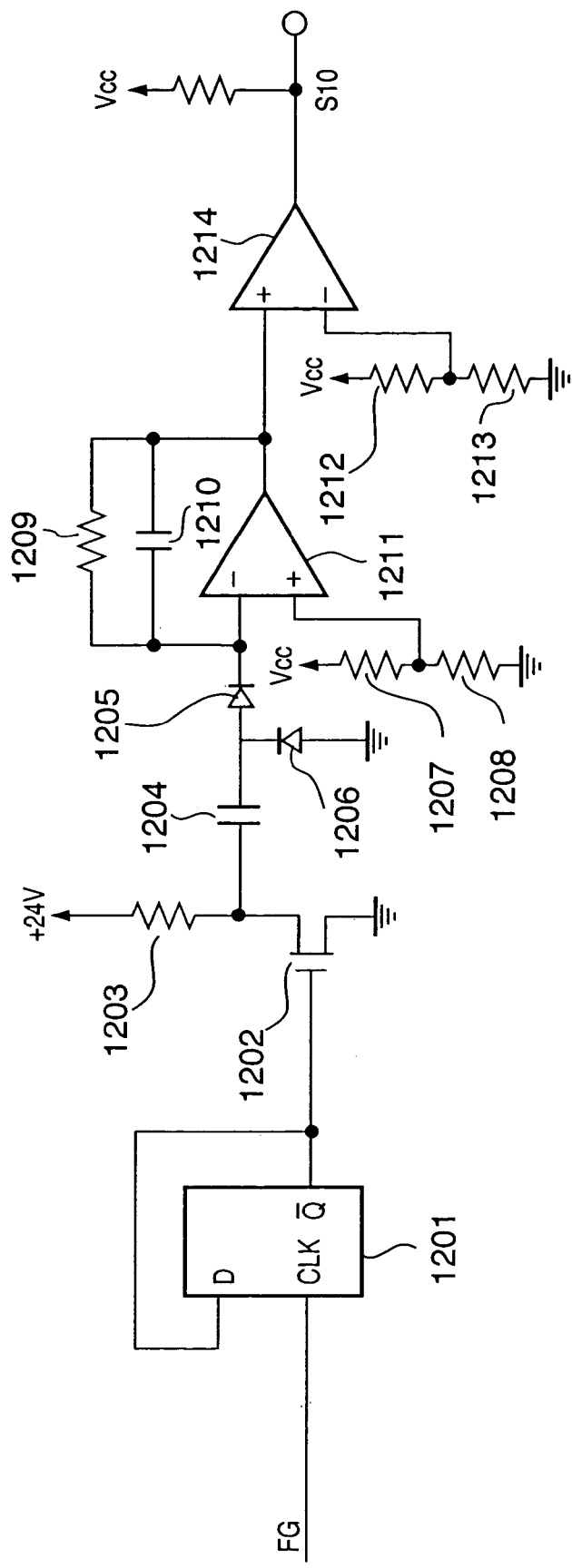
FIG. 12 is a diagram illustrating an example of the structure of a circuit for detecting the rotation of a fusing drive motor according to the second embodiment.

The FG signal is also applied to a motor-rotation detecting circuit 1102. The motor-rotation detecting circuit 1102 detects whether the motor is at rest or not based upon the FG signal and sends a detection signal S10 indicative of this fact to the safety circuit 509'. FIG. 12 illustrates the internal circuitry of the motor-rotation detecting circuit 1102. The input FG signal is frequency-divided down to a rectangular waveform of half the frequency by a D-type flip-flop 1201 to apply a driving voltage to a FET 1202. Owing to driving of the FET 1202 into conduction, a rectangular waveform having an amplitude of 24 V is applied to a capacitor 1204 and a current flows via a diode 1205. The current flows into an integrating circuit comprising an operational amplifier 1211, a resistor 1209 and capacitor 1210. Here the applied voltage is converted to DC voltage. The operational amplifier 1211 produces an output value (Vop) represented by the following equation:

$$Vop = Vt - (24 - Vt) \times C_{1204} \times R_{1209} \times f \div 2$$

where Vt represent the positive input voltage of the operational amplifier 1211, $C_{1204}$ the value of electrostatic capacitance of capacitor 1204, $R_{1209}$ the resistance value of resistor R1209, and f the frequency of the FG signal. As evident from the equation cited above, the output value (Vop) of the operational amplifier 1211 takes on a value that conforms to the frequency of the FG signal. The output of the operational amplifier 1211 is applied to the positive input terminal of a comparator 1214 and is compared with a reference voltage applied to the negative input terminal of the comparator. The output of the comparator 1214 is changed over between high and low levels depending upon the frequency of the FG signal. Thus is output the rotation detection signal S10 that indicates whether the fusing drive motor M2 (118) is rotating or not.

(2) Example of Safety Circuit 509'

Figure 13:
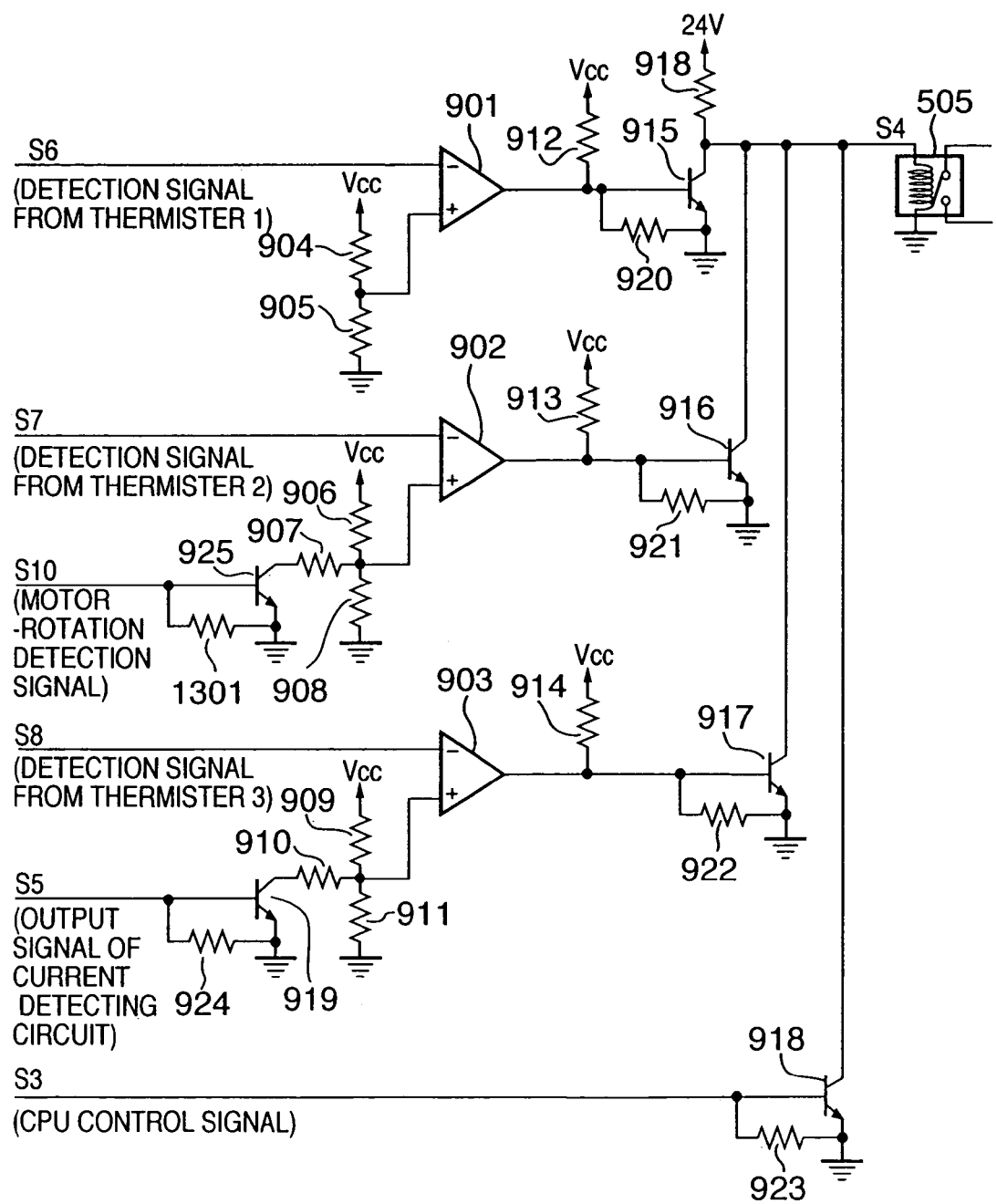
FIG. 13 is a diagram useful in describing a safety circuit according to the second embodiment.

FIG. 13 is a circuit diagram illustrating the safety circuit 509' for controlling interruption of current by detection using thermisters.

The safety circuit 509' differs from the safety circuit 509 of the first embodiment in the method of changing over the reference voltage Vref2, which is compared with the detection signal from thermister 2. The reference voltage Vref2 compared with the detection signal from thermister 2 is changed over in accordance with the result of detection performed by the motor-rotation detecting circuit 1102. Specifically, the operating temperature of the safety circuit 509' is changed over in accordance with the state of rotation of the fusing drive motor M2 (118). The rotation detection signal S10 assumes the low level if the fusing drive motor M2 (118) is rotating. At the time of motor rotation, therefore, reference voltage Vref2 takes on a voltage value that is the result of voltage-dividing Vcc by the resistor 906 and the combined resistance value of the parallel connection between the resistors 907 and 908. On the other hand, if the motor is not rotating, the rotation detection signal S10 rises to the high level and the reference voltage Vref2 is decided by voltage division by the resistors 906 and 908.

FIG. 14 is a table of settings of safety-circuit (509') operating temperatures corresponding to each of the thermisters. The operating temperature differs from that of the first embodiment only with regard to thermister 2.

When the fusing drive motor M2 (118) is rotating, the operating temperature is set to 260° C. Even if end temperature rise occurs at the time of normal operation, the value detected by thermister 2 does not reach 260° C. and therefore the safety circuit 509' is not actuated at the time of normal operation.

At the time of energization runaway, the thermo switch is actuated at the same time that the ceramic heater 205 reaches 250° C., and passage of current into the ceramic heater 205 can be interrupted as a result. The reason for this is as follows: When the fusing drive motor M2 (118) is rotating, i.e., when the pressure roller 202 is rotating, the temperature rise of the pressure roller 202 decreases and the rate of temperature rise of the ceramic heater 205 declines. When the temperature of the ceramic heater 205 reaches the operating temperature (250° C.) of the thermo switch, the thermo switch can be actuated at the same time.

On the other hand, when the fusing drive motor M2 (118) is not rotating, the temperature is set to 220° C. Since end temperature rise is a phenomenon that occurs in a case where sheets of printing paper are passed one after another, end temperature will not exceed 220° C. when the motor is not rotating. Accordingly, the safety circuit 509' will not be actuated at the time of normal operation. At the time of energization runaway, the safety circuit 509' is actuated at a detected temperature of 220° C. and current to the ceramic heater 205 is interrupted.

Thus, as described above, the image forming apparatus of this embodiment is such that from among a plurality of abnormal-overheat sensing circuits that employ thermisters, temperature detected by one abnormal-overheat sensing circuit is changed over in accordance with the state of rotation of a pressure roller. Further, from among a plurality of abnormal-overheat sensing circuits that employ thermisters, temperature detected by another sensing circuit is changed over in accordance with the value of current that flows into the ceramic heater 205.

As a result of the foregoing, even if end temperature rise occurs at the time of normal operation, the safety device will not be actuated erroneously. At the time of energization runaway, passage of current to the ceramic heater 205 can be interrupted at a low temperature.

Specific characteristic values are not illustrated with regard to the circuit elements of the above-described safety circuit 509 (FIG. 9), 509' (FIG. 13) and motor-rotation detecting circuit 1102 (FIG. 12). However, characteristic values corresponding to temperature values desired to be changed over can be set based upon the characteristics of the thermisters and the value of the power supply Vcc. The setting of these characteristic values can readily be performed by those skilled in the art.

Further, in this embodiment, the safety circuit 509 (FIG. 9), 509' (FIG. 13) and motor-rotation detecting circuit 1102 (FIG. 12) are illustrated as analog circuits. However, information such as temperature, current and rotation may be converted to digital data and relay control may be implemented by a program. In such case relay control based upon the program may be implemented by the CPU 501 or a CPU for relay control may be provided separately.

Figure 17:
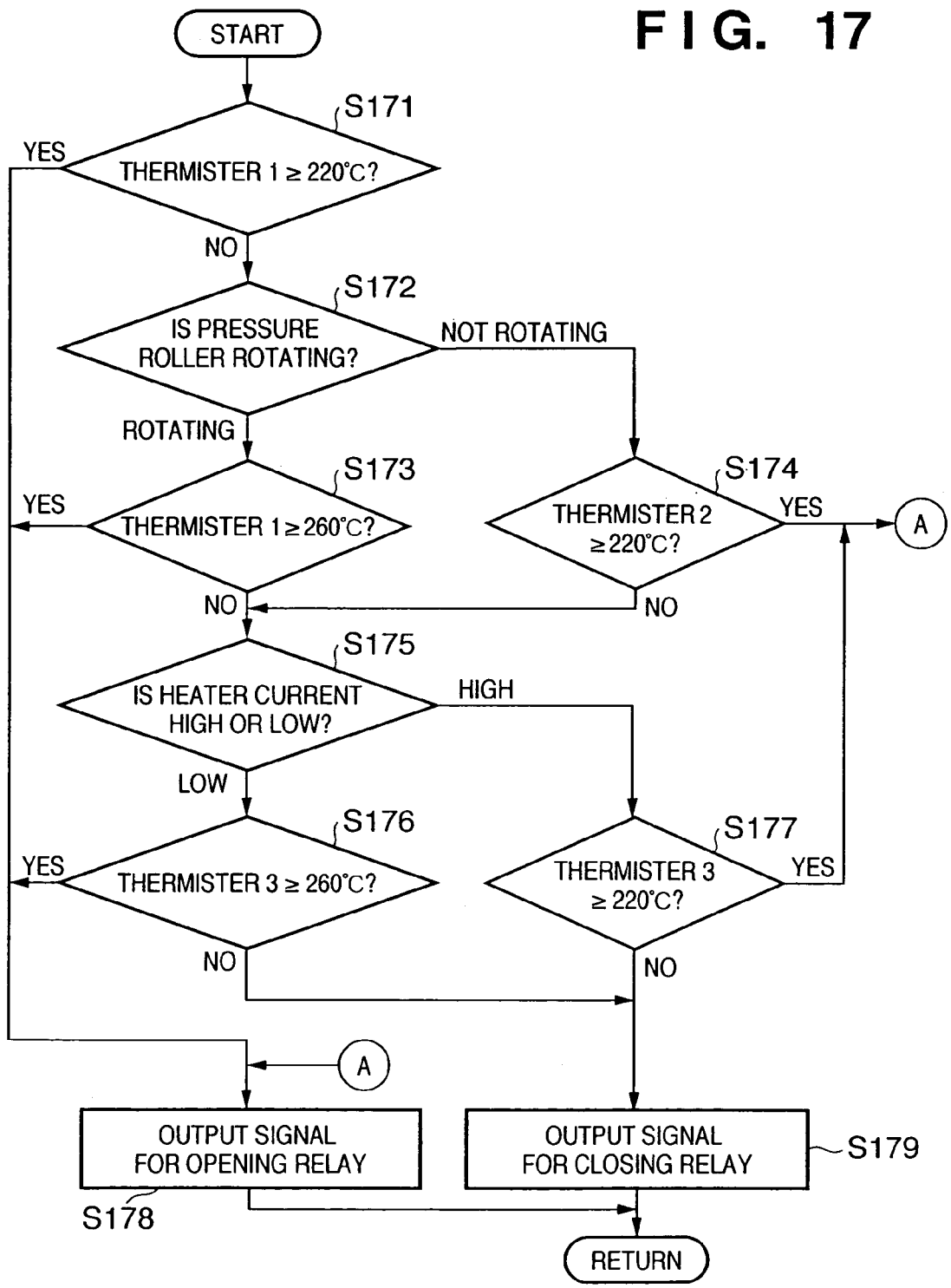
FIG. 17 is a flowchart illustrating an example of a relay control procedure according to the embodiment.

FIG. 17 is flowchart illustrating an example of a procedure for controlling a relay by a program. Although FIG. 17 illustrates a case that corresponds to the second embodiment, the first embodiment can also be implemented by the processing of a similar flowchart [be excluding the branch processing at step S172, or by changing "IS HEATER CURRENT HIGH OR LOW?" at S175 to "IS PASSED-PAPER SIZE LARGE OR SMALL?" (which corresponds to the decision regarding the level of the heater current)].

It is determined at step S171 whether the output data from thermister 1 is indicative of a temperature of 220° C. or greater. If the temperature is equal to or greater than 220° C., control proceeds to step S178, where the relay is opened. If the temperature is less than 220° C., control proceeds to step S172, where it is determined whether the pressure roller is rotating or not rotating based upon output data from the motor-rotation detecting circuit.

If the pressure roller is rotating, it is determined at step S173 whether the output data from thermister 2 is indicative of a temperature of 260° C. or greater. If the temperature is equal to or greater than 260° C., control proceeds to step S178, where the relay is opened. If the temperature is less than 260° C., control proceeds to step S175. On the other hand, if the pressure roller is not rotating, it is determined at step S174 whether the output data from thermister 2 is indicative of a temperature of 220° C. or greater. If the temperature is equal to or greater than 220° C., control proceeds to step S178, where the relay 505 is opened. If the temperature is less than 220° C., then control proceeds to step S175.

It is determined at step S175 whether the heater current from the current detecting circuit 507 is higher than a predetermined value. If the current is low, then it is determined at step S176 whether the output data from thermister 2 is indicative of a temperature of 260° C. or greater. If the temperature is equal to or greater than 260° C., control proceeds to step S178 and the relay 505 is opened. If the temperature is less than 260° C., then control proceeds to step S179, where the relay 505 is closed. If the current is high, on the other hand, it is determined at step S177 whether the output data from thermister 2 is indicative of a temperature of 220° C. or greater. If the temperature is equal to or greater than 220° C., control proceeds to step S178, where the relay 505 is opened. If the temperature is less than 220° C., control proceeds to step S175, where the relay 505 is closed.

The present invention may be applied to a system constituted by a plurality of devices (e.g., a host computer, interface, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes per se read from the storage medium implement the novel functions of the embodiments and the storage medium storing the program codes constitutes the invention. Further, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

Furthermore, it goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the functions of the above embodiments.

In a case where the invention is applied to the above-mentioned storage medium, program codes that cause control corresponding to the above-described flowchart and control circuits to be implemented by a computer are stored on the storage medium.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-139097 filed on May 7, 2004, which is incorporated by reference herein.

What is claimed is:

1. A heat fusing apparatus for thermally fusing toner that has been transferred to a printing medium from a toner image formed on an image bearing member using an electrophotographic process, comprising:
   temperature detecting means placed on a surface of a heating element or in a vicinity thereof, for detecting a temperature of the heating element;
   control means for controlling amount of generated heat of the heating element, in accordance with a temperature detected by said temperature detecting means;
   abnormal temperature judging means for judging an abnormal temperature of the generated heat based on the temperature detected by said temperature detecting means; and
   operational status sensing means for sensing operational status of the heat fusing apparatus,
   wherein said abnormal temperature judging means changes over a reference temperature used for judging the abnormal of the generated heat in accordance with the operation status sensed by said operational status sensing means.

2. A heat fusing apparatus according to claim 1, wherein said operational status sensing means includes means for sensing amount of current that flows into the heating element.

3. A heat fusing apparatus according to claim 1, wherein the heat fusing apparatus has a rotation member placed opposite the heating element, and a pressure roller for pressing the printing medium against the heating element and transporting the printing medium, and
said operational status sensing means includes means for sensing state of rotation of said pressure roller.

4. A heat fusing apparatus according to claim 1, wherein the heat fusing apparatus has a plurality of said temperature detecting means, and said abnormal temperature judging means changes over a plurality of reference temperatures used for judging the abnormal of the generated heat respectively to the temperatures detected by the plurality of said temperature detecting means.

5. An image forming apparatus in which after a toner image formed on an image bearing member using an electrophotographic process is transferred to a printing medium, the toner image is thermally fused on the printing medium by a heat fusing unit, said heat fusing unit comprising:

temperature detecting means placed on a surface of a heating element or in a vicinity thereof, for detecting a temperature of the heating element;

control means for controlling amount of generated heat of the heating element, in accordance with a temperature detected by said temperature detecting means;

abnormal temperature judging means for judging an abnormal temperature of the generated heat based on the temperature detected by said temperature detecting means; and operational status sensing means for sensing operational status of the heat fusing apparatus, wherein said abnormal temperature judging means changing over a reference temperature used for judging the abnormal of the generated heat in accordance with the operation status sensed by said operational status sensing means.

6. An image forming apparatus according to claim 5, wherein said operational status sensing means includes means for sensing amount of current that flows into the heating element.

7. An image forming apparatus according to claim 5, wherein the heat fusing apparatus has a rotation member placed opposite the heating element, and a pressure roller for pressing the printing medium against the heating element and transporting the printing medium, and said operational status sensing means includes means for sensing state of rotation of said pressure roller.

8. An image forming apparatus according to claim 5, wherein the heat fusing apparatus has a plurality of said temperature detecting means, and said abnormal temperature judging means changes over a plurality of reference temperatures used for judging the abnormal of the generated heat respectively to the temperatures detected by the plurality of said temperature detecting means a plurality of said temperature comparing means and a plurality of said reference-value changeover means, and at least two of said plurality of reference-value changeover means change over their reference values in a case where said operational status sensing means has been sensed a predetermined operational status.

9. A heat fusing apparatus for thermally fusing toner that has been transferred to a printing medium from a toner image formed on an image bearing member using an electrophotographic process, comprising:

temperature detecting unit placed on a surface of a heating element or in a vicinity thereof and adapted to detect a temperature of the heating element;

control unit adapted to control amount of generated heat of the heating element, in accordance with a temperature detected by said temperature detecting unit;

abnormal temperature judging unit adapted to judge an abnormal temperature of the generated heat based on the temperature detected by said temperature detecting unit; and operational status sensing unit adapted to sense operational status of the heat fusing apparatus, wherein said abnormal temperature judging unit changes over a reference temperature used for judging the abnormal of the generated heat in accordance with the operation status sensed by said operational status sensing unit.

10. A heat fusing apparatus according to claim 9, wherein said operational status sensing unit includes unit adapted to sense amount of current that flows into the heating element.

11. A heat fusing apparatus according to claim 9 wherein the heat fusing apparatus has a rotation member placed opposite the heating element, and a pressure roller for pressing the printing medium against the heating element and transporting the printing medium, and said operational status sensing unit includes a unit adapted to sense state of rotation of said pressure roller.

12. A heat fusing apparatus according to claim 9, wherein the heat fusing apparatus has a plurality of said temperature detecting units, and said abnormal temperature judging unit changes over a plurality of reference temperatures used for judging the abnormal of the generated heat respectively to the temperatures detected by the plurality of said temperature detecting units.

13. An image forming apparatus in which after a toner image formed on an image bearing member using an electrophotographic process is transferred to a printing medium, the toner image is thermally fused on the printing medium by a heat fusing unit, said heat fusing unit comprising:

temperature detecting unit placed on a surface of a heating element or in a vicinity thereof and adapted to detect a temperature of the heating element;

control unit adapted to control amount of generated heat of the heating element, in accordance with a temperature detected by said temperature detecting unit;

abnormal temperature judging unit adapted to judge an abnormal temperature of the generated heat based on the temperature detected by said temperature detecting unit; and operational status sensing unit adapted to sense operational status of the heat fusing apparatus, wherein said abnormal temperature judging unit changes over a reference temperature used for judging the abnormal of the generated heat in accordance with the operation status sensed by said operational status sensing unit.

14. An image forming apparatus according to claim 13, wherein said operational status sensing unit includes unit adapted to sense amount of current that flows into the heating element.

15. An image forming apparatus according to claim 13, wherein the heat fusing apparatus has a rotation member placed opposite the heating element, and a pressure roller for pressing the printing medium against the heating element and transporting the printing medium, and said operational status sensing unit includes unit adapted to sense state of rotation of said pressure roller.

16. An image forming apparatus according to claim 13, wherein the heat fusing apparatus has a plurality of said temperature detecting units, and said abnormal temperature judging unit changes over a plurality of reference temperatures used for judging the abnormal of the generated heat respectively to the temperatures detected by the plurality of said temperature detecting units.

17. A heat fusing apparatus according to claim 1, wherein said temperature detecting means is placed in an area not passed by the printing medium when a printing medium of small size passes through the heat fusing apparatus.

18. An image forming apparatus according to claim 5, wherein said temperature detecting means is placed in an area not passed by the printing medium when a printing medium of small size passes through the heat fusing unit.

19. A heat fusing apparatus according to claim 9, wherein said temperature detecting unit is placed in an area not passed by the printing medium when a printing medium of small size passes through the heat fusing apparatus.

20. An image forming apparatus according to claim 13, wherein said temperature detecting unit is placed in an area not passed by the printing medium when a printing medium of small size passes through the heat fusing unit.

* * * * *

UNITED STATES PATENT AND TRADEMARK OFFICE
CERTIFICATE OF CORRECTION

PATENT NO. : 7,199,335 B2
APPLICATION NO. : 11/116280
DATED : April 3, 2007
INVENTOR(S) : Hiroshi Takami et al.

It is certified that error appears in the above-identified patent and that said Letters Patent is hereby corrected as shown below:

ON THE COVER PAGE
At Item (56), U.S. Patent Documents, "5,991,585 A*  11/1999 Hanyu et al,"
    should read --5,991,565 A * 11/1999 Hanya et al,--.

IN THE DRAWINGS
Sheet 4, Fig. 4, "ATHERMISTER" should read --THERMISTER--.

COLUMN 1
Line 8, "employ" should read --employs--.
Line 24, "and" should read --and the unfixed image--.

COLUMN 3
Line 13, "present" should read --present invention--.

COLUMN 5
Lines 35 and 36, "Example of Structure of Voltage Follower Output Circuit 116"
    should read --Example of Structure of Voltage Follower Output Circuit--.

COLUMN 8
Line 35, "CPU 501" should read --CPU 501,--.

COLUMN 10
Line 3, "[(point" should read --[point--.
Line 11, "mister" should read --mistor--, and "[(point" should read --[point--.
Line 53, "level;" should read --level,--.
Line 58, "is" first occurrence should read --in--.

COLUMN 13
Line 29, "represent" should read --represents--.
Line 32, "R1209," should read --1209,--.

COLUMN 15
Line 1, "[be" should read --[by--.

COLUMN 17
Line 19, "ing" should read --es--.
Lines 43-49, "a plurality of said temperature comparing means and a plurality of said
    reference-value changeover means, and
        at least two of said plurality of reference-value changeover means change
    over their reference values in a case where said operational status sensing
    means has been sensed a predetermined operational status." should be deleted.

UNITED STATES PATENT AND TRADEMARK OFFICE
CERTIFICATE OF CORRECTION

PATENT NO. : 7,199,335 B2
APPLICATION NO. : 11/116280
DATED : April 3, 2007
INVENTOR(S) : Hiroshi Takami et al.

It is certified that error appears in the above-identified patent and that said Letters Patent is hereby corrected as shown below:

COLUMN 18
Line 5, "includes" should read --includes a--.
Line 8, "claim 9" should read --claim 9,--.
Line 47, "includes" should read --includes a--.
Line 55, "includes" should read --includes a--.

Signed and Sealed this

Eighteenth Day of December, 2007

JON W. DUDAS
*Director of the United States Patent and Trademark Office*